INVENTORS:
PAUL R. SCOTT
RICHARD E. CHRISTENSEN

THEIR AGENT

United States Patent Office 3,515,215
Patented June 2, 1970

3,515,215
FLUID RECOVERY FROM UNDERGROUND
FORMATIONS USING SUPERSATURATED
GYPSUM SOLUTIONS
Paul R. Scott, Houston, and Richard E. Christensen, Midland, Tex., assignors to Shell Oil Company, New York, N.Y., a corporation of Delaware
Filed Aug. 19, 1968, Ser. No. 753,483
Int. Cl. E21b 43/20
U.S. Cl. 166—274                                4 Claims

ABSTRACT OF THE DISCLOSURE

A method for recovering fluids from underground formations using as a drive fluid supersaturated aqueous gypsum solution rendered unplugging to contacting surfaces by addition thereto of a small amount of a dilute sodium chloride aqueous solution which can optionally contain a wetting agent.

This invention relates to fluid recovery from underground formations such as water, gas and/or oil underground reservoirs using as a drive fluid or waterflood a supersaturated gypsum aqueous solution which solution normally tends to plug conduits or flowlines such as tubing string, annular spaces of injection and production well boreholes as well as other types of petroleum recovery equipment such as pumps and the like due to deposition of gypsum on such contacting surfaces, which deposition is prevented or removed by simultaneously or alternately adding into, injecting into or admixing with said supersaturated gypsum solution a small amount of dilute sodium chloride aqueous solution such as a brine solution. Supersaturated gypsum water drive solutions when contacted with dilute sodium chloride solutions inhibit or prevent or remove gypsum deposit on the above type of equipment thus rendering such a drive fluid a cheap and effective waterflood or water driving system for use in effective fluid recovery from underground formations. Also formations subjected to such treatment do not tend to become plugged with gypsum deposits which otherwise would be a major cause of plugging thereby decreasing the permeability of the formation and decreasing or terminating fluid recovery from said formations.

BACKGROUND OF THE INVENTION

It is well known in the art that water is one of the most effective and cheap drive fluids used in fluid recovery from underground formations. Although water used as waterflood or water drive in primary or secondary oil, gas and/or water recovery from underground formations is most desirable for this purpose for reasons stated, generally the water used must be treated or purified to remove therefrom deposit forming materials which generally tend to deposit on equipment or in the formation and plug them. Thus, plugging of flowlines and recovery equipment results in retarding or rendering fluid recovery difficult if not impossible. In many areas the available water is so enriched with these deposit forming agents such as gypsum, sulfur, etc., that it cannot be used unless chemically treated and such treatment is too costly or not available in the field thus rendering the gas, oil and/or water recovery area useless for economic exploitation. This problem is particularly true of oil-bearing formation areas where the only practical available water is supersaturated gypsum solution such as water supersaturated with gypsum and electrolytes. Such supersaturated gypsum solutions when used in waterfloods tend to plug the formation and the tubing string of well boreholes and recovery equipment with thick deposits of gypsum and thereby prevent fluid flow.

The causes of gypsum deposition on pipeline walls from water supersaturated with gypsum is not clearly understood but is believed to be caused by the presence of crystals of solid gypsum which act as seed material for gypsum deposition. These crystals are believed to become trapped and cemented in the rough places of conduit walls and with time grow into large crystals which cause plugging of the line and prevent liquid flow. Although gypsum precipitates very slowly at normal flowline temperatures (65–95° F.) when very few sites for crystal growth are present, even if the water is supersaturated, nevertheless when many such sites are present the excess gypsum tends to drop out rapidly and cause plugging. Thus, the deposition and build up of crystals in a flowline carrying supersaturated water although slow at first, increases with time as more and more crystals are present to cause more rapid deposition. Another factor causing deposition is that as the water travels through the flowline the water becomes more supersaturated because the water cools and is able to deposit more gypsum. Other factors which influence gypsum deposition are the disturbance of the ionic balance of such solutions as well as changes in temperature and pressure of these solutions. Decrease in pressure causes decrease of gypsum solubility in water.

Various methods of preventing and removal of gypsum deposits have been proposed in the art but these have been found to be both costly and ineffective. Thus, use of mechanical means such as scrapers or explosives such as string shot have been used but such methods are time consuming, generally ineffective and dangerous. Also, the use of acids such as HCl has been proposed but this presents a corrosion and handling problem.

Another method for removing gypsum deposits is by modification of the gypsum deposits by chemical means such as by use of carbonate solutions which convert the gypsum to calcite ($CaCO_3$) which is then removed by acidization. Prevention of gysum deposition by precoating the pipelines with chemicals have been also proposed but this is uneconomically unsound and not very effective since in most cases effective chemicals present a corrosion problem.

The problem of preventing and removal of gypsum deposits from supersaturated gypsum (calcium sulfate) water solutions containing also a variety of electrolytes is an extremely important one particularly in areas where any kind of water is at a premium and also because of its increasing importance for use in various commercial applications such as in water-flooding operations for oil recovery where the water need not be pure as for use as a driving fluid or for other industrial purposes.

SUMMARY OF THE INVENTION

It has now been discovered that supersaturated gypsum solutions such as water supersaturated with gypsum and containing electrolytes can be used as effective drive or waterflood fluids without chemically treating or processing such supersaturated solutions to prevent their tendencies to deposit gypsum by adding to such supersaturated gypsum solution a small amount of sodium chloride solution which can optionally contain an organic water-wetting or surface-active agent such as ethoxylates of linear alcohols and the like. Such deposit modifying solutions can be dilute brine solutions or fresh water to which has been added 1000–5000 p.p.m. of sodium chloride. A convenient method of preparing such brine solutions is by injecting fresh water into a salt dome or formation as shown in FIG. 1 and recovering a brine solution which is thereafter admixed with the supersaturated gypsum solution and the mixture used as an effective waterflood in recovering fluids from underground formations as shown in FIG. 2.

BRIEF DESCRIPTION OF THE DRAWINGS

The FIG. 1 represents an earth formation containing a salt dome which salt dome can be the source for use in the process of the present invention by penetrating the salt dome with a well through which water is injected into the well and from which a salt solution is recovered and the salt solution purified if necessary and used as a gypsum inhibitor.

DESCRIPTION OF THE PREFERRED EMBODIMENT

Figure 1:
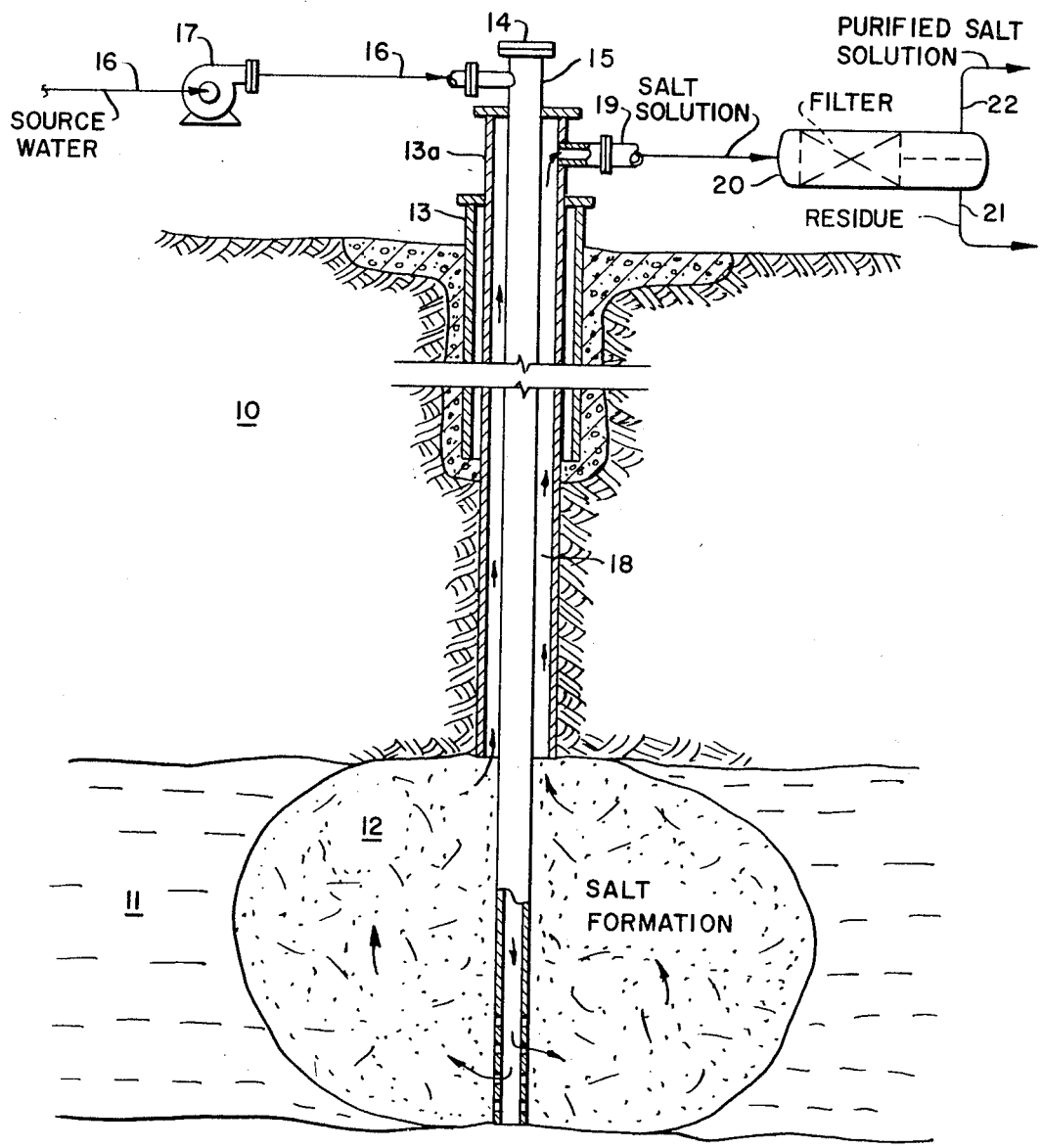

FIG. 1 represents a salt containing formation having an overburden 10, and a salt containing area 11 in which is a salt formation 12 penetrated by a well borehole 13 and 13a containing a tubing string 14 having perforations 15. The tubing string 14 is connected with pipe 16 into tubing string 14 and into the formation 12. The salt solution formed in 12 is pumped through the annulus 18 into pipe 19 through filter 20 where any residue is removed via line 21 and the salt solution is pumped via valved line 22 into line 23 of FIG. 2.

Figure 2:
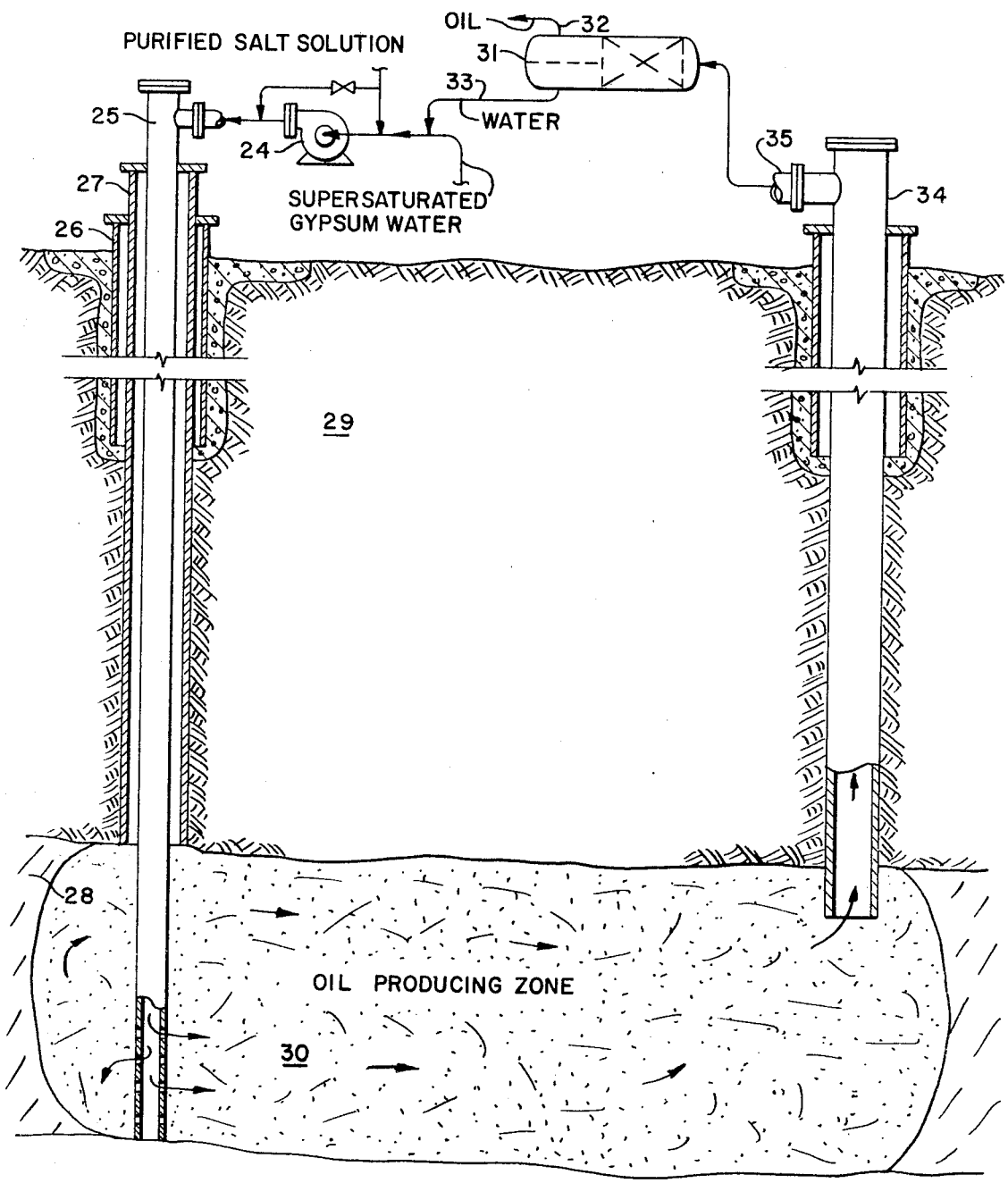
FIG. 2 represents an oil bearing formation from which oil is recovered with the aid of a fluid drive consisting of injecting into the oil bearing zone a mixture of supersaturated gypsum water and a salt solution, which mixture drives the oil to a production well from which oil is recovered.

In FIGURE 2 the supersaturated gypsum water is pumped via line 23 via pump 24 into tubing string 25 which is part of a well borehole 26 having casing 27 penetrating an oil-producing formation 28 beneath an overburden 29. The tubing string 25 has perforation 30 through which the fluids from lines 22 and 23 are injected into the formation. The oil and water can be recovered via the production well 34 and goes via line 35 into separator 31 and oil is recovered via line 32 and the water via line 33 which if desired can be injected into line 23.

Figure 3:
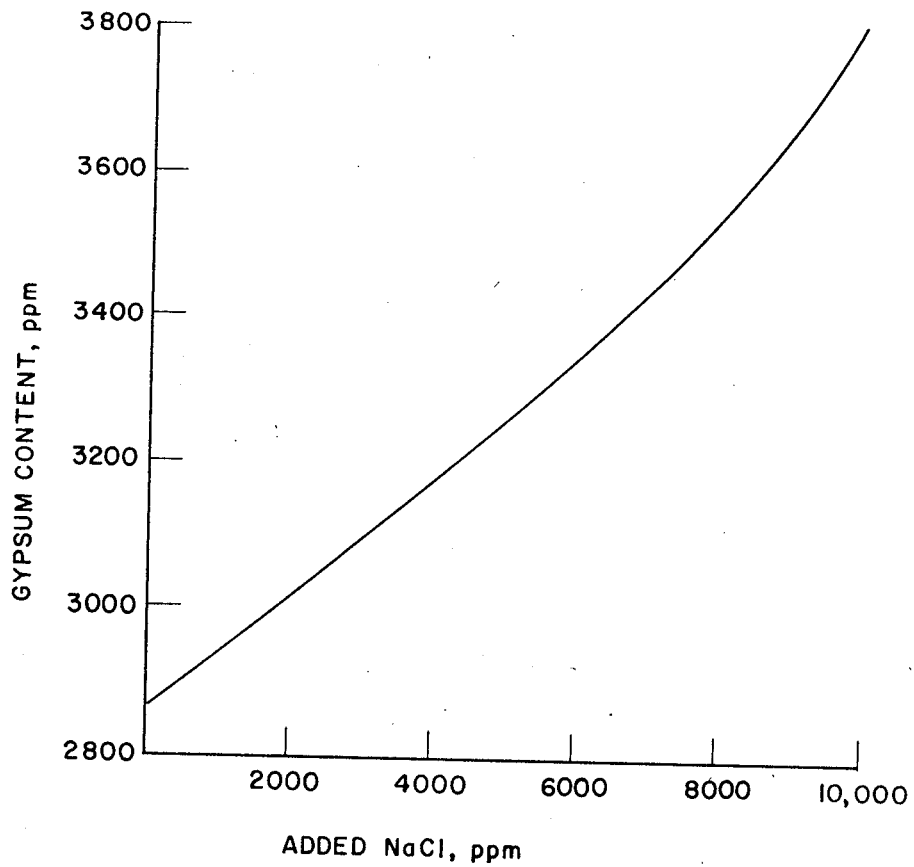

Adding sodium chloride (about 2000 p.p.m.) to increase the gypsum solubility appears to be the ideal method for controlling the gypsum deposition problem. As shown in FIG. 3, addition of salt to a composite sample of water supersaturated with gypsum from a West Texas Water Supply System (WTWSS) increases the solubility of gypsum in this water. Increasing the gypsum solubility of the water will not only stop the deposition but will dissolve and remove from the system the gypsum deposits already present. This will also improve the quality of the water with respect to its compatibility with other formation waters. There are three possible ways of increasing the salt (sodium chloride) content of the water:

(1) Add salt from brine-producing wells drilled within the confines of the water supply field;

(2) Extract salt from a formation as shown in FIG. 1 with area water, e.g., West Texas Water Supply System, and inject the salt saturated water back into the system in the proper ratio; and (3) Add purchased salt to the system or purchased brine water to the system.

There are large quantities of sodium chloride available as in the West Texas Water Supply System (WTWSS) water well area in salt beds within the formation as the Salado Formation in Texas and this is a very desirable method of obtaining brine solutions. A slip stream from the suction line or a well lateral could be injected into such formations to pick up the needed salt, then reinjected into the system shown in FIGS. 1 and 2. A slip stream of about 3500 b.p.d. (85% saturated) would supply essentially all the salt required to stop deposition and to slowly remove the gypsum deposited in this system.

The wetting or surface-active agents which can be optionally used in combination with the dilute sodium chloride solution or as a separate aqueous slug which can be injected independently into the formation to prevent gypsum deposits in the tubing string, or around the borehole of the formation can be organic materials which tend to water wet the areas of gypsum deposition.

PREFERRED EMBODIMENT OF THE INVENTION

To illustrate the effectiveness of the process of the present invention in recovering oil from underground formations using as the waterflood aqueous composition of the present invention.

The wells shown in Table 1 were treated with water supersaturated with gypsum and the same water to which a dilute brine solution was added and the results are shown below.

TABLE 5

| Well | Amount of 10#/ gal. Brine Added to Supersaturated Gypsum Solution | Production (b.p.d.) | | | |
|---|---|---|---|---|---|
| | | Before | | After | |
| | | Oil | Water | Oil | Water |
| Witcher A-8 | 410 bbls | 18 | 150 | 70 | 440 |
| Witcher A-5 | 270 bbls | 70 | 45 | 80 | 65 |
| Witcher A-4 | 410 bbls | 20 | 165 | 30 | 400 |

It is understood that various changes in the details described to explain the invention can be made by persons skilled in the art within the scope of the invention as expressed in the appended claims..

We claim as our invention:

1. A method of recovering oil from an underground formation without plugging the recovering equipment and the formation with gypsum deposits comprising of:

(a) mixing above ground an aqueous solution supersaturated with gypsum and an aqueous solution containing sodium chloride in an amount of from 1,000 to 5,000 p.p.m.;

(b) injecting said mixture through an injection well into the formation; and (c) recovering fluids from said formation.

2. The method of claim 1 wherein the dilute sodium chloride solution contains a water wetting agent.

3. The method of claim 1 wherein the supersaturated solution is water supersaturated with gypsum and which also contains electrolytes and the sodium chloride solutions is brine.

4. The method of claim 3 wherein the recovered fluids are water and oil.

References Cited

UNITED STATES PATENTS

| 239,417 | 3/1881 | Alfieri | 252—175 X |
| 1,405,783 | 2/1922 | Holle | 252—175 X |
| 2,777,818 | 1/1957 | Gambill. | |
| 2,947,690 | 8/1960 | Axelrad | 210—57 |
| 3,258,071 | 6/1966 | Shen et al. | 166—275 |

FOREIGN PATENTS 148,547    1922   Great Britain.

OTHER REFERENCES

Cozzens, F. R.: Brine Baths for Dirty Wells, In Oil Weekly, 117(7), Apr. 16, 1945, pp. 54 & 56.

Frick, Thos. C.: Petroleum Production Handbook, vol. II, New York, McGraw-Hill (1962), pp. 41–62 thru 41–68.

ERNEST R. PURSER, Primary Examiner

I. A. CALVERT, Assistant Examiner

U.S. Cl. X.R.

166—275